United States Patent
Weilenmann (10) Patent No.: US 7,239,761 B2
(45) Date of Patent: Jul. 3, 2007

(54) METHOD FOR CALIBRATING A MEASURING INSTRUMENT

(75) Inventor: Jürg Weilenmann, Widnau (CH)

(73) Assignee: Leica Geosystems AG, Heerbrugg (CH)

(*) Notice: Subject to any disclaimer, the term of this patent is extended or adjusted under 35 U.S.C. 154(b) by 691 days.

(21) Appl. No.: 10/473,413

(22) PCT Filed: Mar. 27, 2002

(86) PCT No.: PCT/EP02/03450

§ 371 (c)(1),
(2), (4) Date: Sep. 30, 2003

(87) PCT Pub. No.: WO02/079730

PCT Pub. Date: Oct. 10, 2002

(65) Prior Publication Data

US 2004/0107063 A1    Jun. 3, 2004

(30) Foreign Application Priority Data

Mar. 31, 2001  (EP) .................................. 01108218

(51) Int. Cl.
*G06K 9/20* (2006.01)

(52) U.S. Cl. ..................................................... 382/312

(58) Field of Classification Search ................ 382/101, 382/106, 107, 112, 141, 151, 154, 312; 348/86, 348/94, 95, 129, 135, 180
See application file for complete search history.

(56) References Cited

U.S. PATENT DOCUMENTS

| | | | |
|---|---|---|---|
| 7,027,642 B2 * | 4/2006 | Rubbert et al. | 382/154 |
| 7,058,213 B2 * | 6/2006 | Rubbert et al. | 382/128 |
| 7,068,825 B2 * | 6/2006 | Rubbert et al. | 382/128 |

FOREIGN PATENT DOCUMENTS

| | | |
|---|---|---|
| CH | 658514 | 11/1986 |
| DE | 4331151 | 3/1995 |
| DE | 19911822 | 8/2000 |

* cited by examiner

*Primary Examiner*—Jose L Couso
(74) *Attorney, Agent, or Firm*—McGrath, Geissler, Olds & Richardson, PLLC (57) ABSTRACT

Calibration of measuring instruments resides in measuring external references which themselves have been measured with other devices and contain positioning errors. A method/system/apparatus is disclosed for calibration of a measuring instrument using at least two partial systems, one having structural elements that can be imaged on a detecting component to calibrate the instrument without the use of external references.

33 Claims, 1 Drawing Sheet

Fig. 1

METHOD FOR CALIBRATING A MEASURING INSTRUMENT

This application is the national phase under 35 U.S.C. § 371 of PCT International Application No. PCT/EP02/03450 which has an International filing date of 27 Mar. 2002, which designated the United States of America and which claims priority on European Union Patent Application number EP 011 082 18.7 filed 31 Mar. 2001, the entire contents of which are hereby incorporated herein by reference.

FIELD OF THE INVENTION

The invention relates generally to a method, apparatus, and system for calibrating a measuring instrument.

BACKGROUND OF THE INVENTION

A quality feature of sensors or measuring instruments is the distribution of errors with which the measured values produced by them are associated: typically, it is required that the measurement errors lie with a specified probability within the specified limits or their mean value and their standard deviation lie within specified limits. In the production of measuring instruments, it may be technically or economically advantageous to ignore the accuracy specification and subsequently to determine the systematic measurement errors consciously accepted thereby by a suitable method—referred to below as calibration—and to reduce said errors computationally or by adjustments of the measuring instrument to such an extent that the accuracy specifications are fulfilled in subsequent measurements.

Calibration of measuring instruments, for example of angle-measuring instruments of the type described in CH 658 514 A5, consists in measuring, with the still uncalibrated instrument, a number of known measurement positions—referred to below as reference positions—and declaring the difference between measured positions and reference positions as measurement errors at the measured points and interpolating these, by a mathematical model describing their dominant components, over the total measuring range of the measuring instrument and processing them numerically and storing them in such a way that they can be computationally compensated in all subsequent measurements, the apparatus correction of the measuring instrument by adjusting devices provided for this purpose representing in principle an alternative. A characteristic feature of the calibration of background art is that it is based on external measurement (for measuring the reference positions).

The use of external systems/methods of measurement for calibrating measuring instruments gives rise to two difficulties, a fundamental one and a technical one. The common cause of both difficulties is the fact that knowledge of the reference positions is also incomplete: incorrect measurements are "corrected" on the basis of other incorrect measurements. This can be effected only by dividing the differences between the two measurements into an instrument error and a reference error. In accordance with background art to date, this division is effected on the basis of a statistical estimation procedure which in turn is based on statistical assumptions relating to the correlation of the errors of the two measurements. The credibility and reliability of these assumptions can be established only by further measurements, with the result that a further calibration problem arises. The basically endless cascade of calibration which begins in this way—the fundamental difficulty mentioned—is ended in practice by ensuring that the accuracy of the knowledge of the reference positions is much higher than the accuracy of measurement required by the calibrated measuring instrument. This gives rise to a technical difficulty that a more accurate measurement procedure has to be provided for the reference positions for each measuring instrument to be calibrated, which, for example in the case of angle measurements with accuracies of angular measurement in the sub-angular second range, is technically complicated and hence uneconomical. Moreover, owing to the technical requirements with respect to the reference positions, calibration methods of background art are generally carried out by the manufacturer, which makes it more difficult to effect continuous calibration of the measuring instrument for compensation of environmental influences and wear and aging processes.

The problems inherent to background art to date can be solved only by eliminating their cause, i.e. effecting the calibration without the use of external measuring systems/methods.

SUMMARY OF THE INVENTION

One exemplarily embodiment of the invention relates to calibration methods—referred to below as self-calibration—for mechanical measuring instruments having at least two partial systems moving relative to one another and generally comprising rigid bodies, as realized, for example, in angle sensors of CH 658 514 A5, and a measuring instrument provided for carrying out the method, a calibration apparatus, the use of the method for calibrating a plurality of measuring instruments, a computer program product and a computer data signal.

An object, of an embodiment of the invention, can be achieved to provide a method and suitable apparatuses with which a calibration can be carried out without the basic errors originating from comparative measurements, such can be achieved by fundamentally dispensing with external reference positions as self-calibration, but optionally with inclusion of external reference positions as hybrid calibration.

An object, of an embodiment of the invention, can be achieved to check the suitability of the self-calibration.

An object, of an embodiment of the invention, can be achieved to produce a measured value with a calibrated measuring instrument. Such can be achieved by calculating the measured value as an estimated value by using a model which describes the measuring procedure and on which the calibration too is based.

An object, of an embodiment of the invention, can be achieved to provide permanent self-calibration. Such can be achieved according to an embodiment of the invention to include further parameters, in addition to the measured values, in the estimation process, in particular those which quantify environmental effects, such as, for example, temperature influences and aging processes, on the accuracy of measurement. It would thus be possible to realize permanent self-calibration which can be extended to include multiple measuring instruments and which would possibly stop an environment- or aging-related deterioration in the accuracy of measurement.

Various embodiments of the invention can be achieved by one of ordinary skill in the art by the following detailed description.

BRIEF DESCRIPTION OF THE DRAWINGS

An exemplary embodiment of the invention is explained in more detail on the basis of a drawing, in which.

DETAILED DESCRIPTION OF THE PREFERRED EMBODIMENTS

In a method, according to an embodiment of the invention, for calibrating a measuring instrument comprising at least two partial systems moving relative to one another and comprising a system/method for producing an image of at least one first partial system on at least one detecting component of at least one partial system, a mathematical model describing the position of the partial systems relative to one another and at least one image can be produced in a first step. In principle, parameters influencing the measuring process, such as, for example, position, shape, structure parameters of the partial systems, parameters of the image, and a system/method for producing the image, can be used in the modelling. For example, the spatial positions of a light source and of a light-sensitive detector can be used as parameters in the model.

The partial systems, which can be movable relative to one another, and which can be generally rigid bodies but which may also be, for example, fluid, deformable media, etc . . . can be described in this model with respect to those features of their relative position and their physical properties which are relevant for the measuring process. The partial systems may be, for example, movable relative to one another (e.g. translationally, rotationally, etc . . . ), a liquid surface, and may have an inclination variable relative to another partial system. For example, a first partial system can be focused onto a liquid surface as a second partial system. From this, focusing can be effected in turn onto a third partial system. The focusing onto the third partial system can be described as a function of the position of the liquid surface, for example chosen to be reflective. The degrees of freedom of the relative movement of the partial systems of the measuring instrument can be limited by the constraining conditions, such as, for example, a rotation of a partial system relative to the other partial systems about a rigid axis.

Depending on the design of the measuring instrument, the parameters describing structural elements, such as, for example, the position of individual marks, position parameters of the partial systems and imaging parameters can be linked to one another in the mathematical model. Parameters chosen for formulating the model need not necessarily have a geometric, physical or statistical meaning. Often, it is expedient to convert the original mathematical model into a structurally simpler form by reconfiguration and to dispense with direct interpretability of the new parameters.

In the next step, an image of structural elements of at least one first partial system, which determines the relative position of the partial system, can be focused onto the second partial system so that the image contains information about the positions of the two partial systems relative to one another. The structural elements may represent, for example, the specific external shape of the first partial system or a mark applied to the first partial system. The design of the image of these structural elements should be chosen so that it contains sufficient information for determining the relative position of the partial systems, in particular the size of the section of the structural elements which can be required for unambiguous localization of the position being decisive.

In the following step, the detecting component converts the image of the structural elements of the first partial system into signals from which, in a further step, at least one signal vector having at least one component and containing information about the relative position of the partial systems can be recorded. The recording of the signal vector is explained in more detail below.

In a further step, the "stochastic model errors", often also referred to as "noise", i.e. the randomly controlled discrepancy between reality and model, can be modelled as random quantities and assumptions can be made about their probability distributions, which assumptions in turn may contain unknown parameters. From the at least one signal vector which can be linked by the model to the unknown parameters, the parameters can be estimated using the statistical estimation theory, so that a quality criterion can be optimized. Estimation of maximum likelihood of noise or minimum estimation error variance are examples of widely used quality criteria.

Statistical parameter estimation methods produce not only estimated values for the model parameters but inevitably also estimated values for the noise, i.e. the residues. According to the model, they can be realizations of the random quantities which have been included in the mathematical model. By statistical tests, it is now possible to check a posteriori the hypothesis concerning whether they can be actual realizations of random quantities with the postulated statistical properties. Such "residue analyses" can give important information about the suitability or worthiness of improvement of the mathematical model used for the calibration.

In the final step, correction values intended to reduce measurement errors of the measuring instruments can be derived from the estimated parameter values and made available. This can be effected by storing the correction values coordinated with a respective position, a computational correction being effected during the measuring process. In principle, when appropriate technical adjusting systems/methods are available, the correction values can also be converted into apparatus corrections.

Individual steps or a plurality of steps of the method can be repeated once or several times. In an embodiment of the method, after creation of the mathematical model for a measuring instrument and derivation of at least one parameter set, the following steps of production of images, conversion thereof into signals and recording of signal vectors can be repeated several times in succession. The number of repetitions depends on the intended quality of the estimation of the values of the parameter set, which quality obeys statistical laws.

After the end of these steps, estimation of the values and derivation and provision of correction values can be effected. In another, recursive variant of the method, the values of the parameter set can be estimated again after each production of an image and the subsequent steps.

Another embodiment of the method uses a mathematical model with at least one parameter set, associated therewith, for the calibration processes for a plurality of measuring instruments of the same type, so that the first two steps of the method can be carried out in the calibration of the first measuring instrument of a whole series and the further measuring instruments can be calibrated with the use of this model and of the at least one parameter set.

In terms of apparatus, the system/method used for imaging may consist, for example, of at least one electromagnetic radiation source, light in the visible spectral range preferably being used. Owing to the special technical requirements of the measuring instrument to be calibrated, it may in particular be necessary to influence the beam path in the measuring instrument with imaging or wavefront-structuring optical elements or to effect multiple reflection for lengthening the beam path. The image can be reflected back and forth several times between the partial systems, or consecutive imaging of the partial systems on one another can be effected.

In the production of an image, structural elements of a partial system can be focused on a second partial system so that the image contains information about the associated relative position of the partial systems. The relative position can be determined from the image. The imaged component of the first partial system and its structural elements, in particular the density and differentiability thereof, can be related. For example, one of the partial systems may be designed in its form so that a sufficiently large image part is sufficient for determining the relative position. This is possible, for example, by a special shape of the contour of the partial system, with position-dependent geometrical parameters; in the case of a disc rotating about an axis, for example, the distance of the disc edge from the axis can be designed as a unique function of the angle with respect to a zero position. In general, however, variation of the shape of a partial system can be associated with undesired physical effects, so that alternatively structural elements in the form of a mark may also be applied. This can be effected, for example, by coding with a sequence of alternately transparent and opaque code lines or of code lines having alternately different reflectivity. From a code segment focused on the detecting component, it should then be possible to determine the relative position of the partial systems.

In order to avoid undesired physical effects, such as, for example, deviation moments, it is possible, particularly in the case of rotational movements of the partial systems, for one partial system to be formed with a rotationally symmetrical shape, for example as a sphere, cylinder, disc or ring. Coding can then be applied, for example, to a smooth section of the body or in an area in the interior of a translucent body.

The detecting component and all following systems/methods for recording at least one signal vector from the signals of the detecting component, for deriving and making available correction values and for reducing systematic measurement errors of the measuring instrument may contain components of analogue and/or digital electronics and in each case be designed according to the background art with systems/methods for signal and information processing.

In its technical design, the detecting component can be tailored to the requirements specified by the imaging system/method. In an exemplary use of visible light, it is possible in principle to use all possible forms of light-sensitive sensors, for example photomultipliers, photosensitive diodes or CCD cameras.

The system/method for recording at least one signal vector from the signals of the detecting component should meet the technical requirements thereof. For example, they may have an analogue/digital converter (ADC) and at least one processor for processing the signal and for converting them into a signal vector.

In the system/method for deriving and making available correction values, the method step comprising the estimation of values of the parameter set from the at least one signal vector can be implemented. It is preferably realized by at least one electronic computer and supplementary memory modules.

The system/method for reducing systematic measurement errors of the measuring instrument may permit purely computational correction of the measured values obtained, for example by an electronic computer, or may comprise apparatuses for mechanical or electronic correction, for example precision mechanical drives, piezoelectric control elements, or an electronic correction of recording errors of the detecting component.

Figure 1:
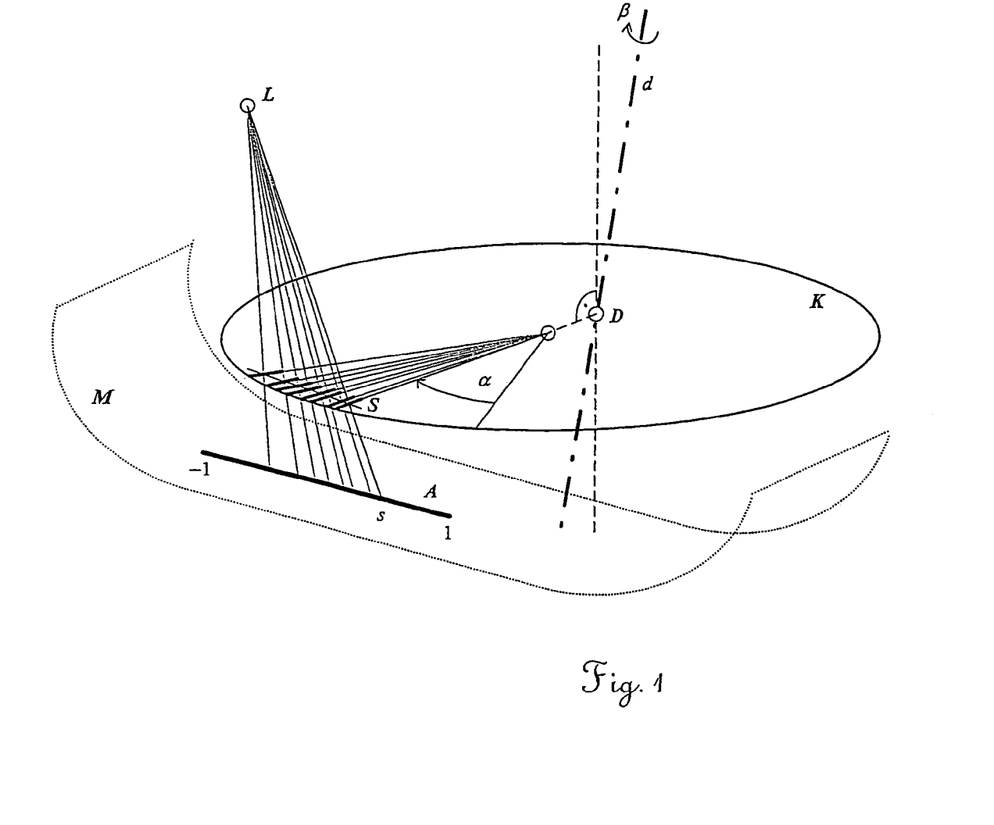
FIG. 1 shows the geometric conditions of the angle sensor described.

A method according to an embodiment of the invention, a measuring instrument according to an embodiment of the invention, or a calibration apparatus according to an embodiment of the invention, can be described by way of an example for the calibration of an angle-measuring instrument, referred to here as an angle sensor, which is explained in more detail, purely by way of example, on the basis of embodiments shown schematically in the drawing.

FIG. 1 shows the geometric conditions of the angle sensor described.

This includes a sensor housing, shown only partly here, as second partial system M, which is represented below by the light source L, the array A as a detecting component and the axis d of rotation, and a disc freely rotatable relative to this about the axis d of rotation—referred to below as circle—as a first partial system. The light source L as an imaging system forms a segment of a line code $\Sigma$ arranged radially on the circle and consisting of a sequence of alternately transparent and opaque code lines as structural elements S on the array A of photosensitive diodes, for example a CCD array, as a detecting component in the thrown shadow. The position of a specific structural element on the circle is described by its positional angle $\alpha$ relative to a randomly chosen zero position. The position of the image of a specific structural element S on the array A is described by the image coordinate s. The position of the circle relative to the sensor housing is characterized by the circle position angle $\beta \epsilon [0, 2\pi[$, through which the circle has to be rotated from a randomly defined zero position about the axis d of rotation rigidly connected to it, in order to assume its actual position.

The angle sensor can form an estimated value $\hat{\beta}$ for the circle position angle $\beta$ from the intensity distribution of the incident light—referred to below as sensor signal—which is scanned by the array A and A/D converted, and output an estimated value as a result of the measurement which fulfils the specified accuracy requirements for the measurement error $\hat{\beta} - \beta$.

Systematic errors can be the result of insufficient quantitative knowledge of the influencing factors which, apart from the circle position angle $\beta$, contribute to the formation of the sensor signal. Thus, if it is possible to determine more accurately these influencing factors too from sensor signals, in addition to the unknown circle position angles, the angle sensor can achieve the accuracy requirements by self-calibration without external reference angles.

The features of the angle sensor which contribute substantially to the signal shape should be mentioned explicitly and the mechanisms of their influence on the sensor signal should be revealed. This can be effected by a mathematical model of the angle sensor which quantitatively links the circle position angle with the sensor signal and in which these influencing factors can be used as model parameters, the number of which should be kept finite for practical reasons. Thus, the angle sensor calibration can be based on the estimation of the model parameters from sensor signals, i.e. on a classical parameter estimation problem of mathematical statistics. The self-calibration thus differs from the calibration by reference angles in that it replaces external measuring system/method by the internal "optimal" adaptation of a sensor model to the sensor signals. The two calibration methods can be easily combined to give a hybrid calibration.

The mathematical model of the angle sensor can be the foundation of the self-calibration. A method for formulating such a model starts, for example, from the idealized concept that the light source L can be a point source, the code lines of Σ can be arranged radially in the plane K of the circle, the diodes of the array A can be arranged linearly and the circle or the line code Σ can be rigidly connected to the axis d of rotation, which ideally can be perpendicular to the plane K of the circle. The spatial arrangement of L, d, the point of intersection of d with K—referred to below as circle rotation centre D—and A can be assumed to be rigid, i.e. invariant as a function of time, and to be designed so that an image of a continuous segment of Σ can be produced on A for each circle position angle β.

The relative positions of L, d, D and A or of Σ, D and d, which can be rigid according to the model, can be described by 7 or 4 real parameters according to generally known principles of analytical geometry and with the use of trignometrical functions, and the relative position of these "rigid bodies" can be characterized by the circle position angle β∈[0,2π[.

In terms of these 11 position parameters time-invariant according to the model and of the circle position angle β, it is possible to use generally known calculation rules of three-dimensional vector algebra, of elementary algebra and of elementary trigonometry to calculate where a specific structural element S of the line code Σ, for example an edge of a code line which can be characterized by the position angle α∈[0, 2π[, which it makes with a randomly chosen zero position in K, can be produced as an image on the array A. The position of this image on the array A can be described by a dimensionless imaging coordinate s∈⌊−1,1⌋ where −1 denotes one end, 0 the midpoint and +1 the other end of the array A. The zero positions of the position angles α measured in the plane K of the circle and of the circle position angles β measured in the plane normal to d can be matched with one another in such a way that, in the equation which represents the imaging coordinate s as a function of the angles α and β and of the 11 time-invariant position parameters, the circle position angle β occurs in the difference α−β.

In addition, this equation can be formally simplified by combining the functional logic operations of the 11 position parameters occurring in it to give new, dimensionless time-invariant model parameters. Finally, a comparison of the individual effects of these new model parameters on s shows which of these effects can be ignored for the purpose of reducing the complexity with a very small model error, and that it is possible to manage with k<11 time-invariant model parameters.

An expedient choice is k=6, in which case the equation mentioned can be brought into the form $$s = \hbar(\alpha, \beta; p, q, u, v, x, y) \quad (0)$$
$$= \frac{\sin(\alpha - \beta) + u \cdot \cos\alpha + v \cdot \sin\alpha}{p \cdot \cos(\alpha - \beta) + q \cdot \sin(\alpha - \beta) + x \cdot \cos\alpha + y \cdot \sin\alpha}$$

p, q, u, v, x, y denoting the 6 dimensionless time-invariant model parameters and the angles α, β∈[0,2π[ having the meaning defined above. If the axis d of rotation is perpendicular to the plane K of the circle, x=y=0, and if the circle rotation centre D coincides with the centre of the line code Σ, u=v=0; a further expedient choice is therefore also k=4 and x=y=0.

Of interest—both for the self-calibration and for the angle measurement—is the fact that equation (0) can be uniquely solved for every argument of $\hbar$ in all cases relevant in practice, expedient restrictions can, in the case of solutions for α and β, be imposed. It is helpful to express the solution of equation (0) for the jth argument of h as a function $\hbar_j^{-1}$ of all variants involved. Thus, $\hbar_1^{-1}(s, \beta; p, q, u, v, x, y)$ denotes the unique solution of (0) for the 1st argument α of $\hbar$ in the interval $$]\beta - \frac{\pi}{2}, \beta + \frac{\pi}{2}[,$$

$\hbar_2^{-1}(\alpha, \beta; p, q, u, v, x, y)$ denotes the unique solution of (0) for the 2nd argument of β of $\hbar$ in the interval $$]\alpha - \frac{\pi}{2}, \alpha + \frac{\pi}{2}[,$$

etc.

The solution of equation (0) for the arguments 1 and 3–8 is easily performed using generally known calculation rules of elementary algebra and of elementary trigonometry, and the solution of (0) according to the 2nd argument is $$\hbar_2^{-1}(\alpha, s; p, q, u, v, x, y) = \alpha - \arctan\left(\frac{z - z' \cdot \sqrt{1 - z'^2 + z^2}}{1 - z'^2}\right) \quad (1)$$

$$z = \frac{p \cdot s}{1 - q \cdot s}$$

$$z' = \frac{(u - x \cdot s) \cdot \cos\alpha + (v - y \cdot s) \cdot \sin\alpha}{1 - q \cdot s}$$

if the inequality |z'|<1 is satisfied. The basis of the angle measurement is the unique solution (1) of the equation (0) for the circle position angle β: if the model parameters p, q, u, v, x and y are known and it is possible to assign the structural element S of the line code Σ; which element is characterized by the position angle α, to its image s on the array A, the circle position angle β can be calculated according to (1). Therefore the line code Σ can be decodable, i.e. to arrange the code line in such a way that, for each β∈[0,2π[ from the image of the code segment projected by the light source L onto the array A, this code segment can be uniquely localized on the circle.

There can be many possibilities for making Σ decodable. A known method uses an m-sequence of length $m=2^l-1$, where l is a natural number, i.e. a cyclic binary sequence b, consisting of $$\frac{m-1}{2}$$

zeros and ones, which has the property that, for each natural number n<m, there is exactly one partial sequence of b consisting of l successive digits which represents l in binary form: choose two different angles $\alpha^0$, $\alpha^1 > 0$ so that $$\frac{m-1}{2} \cdot \alpha^0 + \frac{m+1}{2} \cdot \alpha^1 = 2\pi,$$

choose an angle $0 < \alpha^+_0 < \min\{\alpha^0, \alpha^1\}$, define the angles $\alpha_i^{\mp} \in [0, 2\pi[$ recursively according to $\alpha^-_0 := 0$ and $\alpha_i^{\mp} := \alpha_{i-1}^{\mp} + \alpha^{b(i)}$ for $0 < i < m$, and let $$\sum(\alpha) := \begin{cases} 1, & \text{if } \alpha_i^- \leq \alpha \leq \alpha_i^+ \text{ for one } i \in [0, m[ \\ 0, & \text{otherwise} \end{cases} \quad (2)$$

This line code $\Sigma$; where 1 indicates 'transparent' and 0 indicates 'opaque', is a physical realization of the binary sequence b whose sectorial image on A is clearly recognizable with an advantageous choice of l and the angles $\alpha^0$ and $\alpha_0^+$, which makes $\Sigma$ decodable.

The configuration (2) of $\Sigma$ by the 2m−1 angles $\alpha_0^+$, $\alpha_1^{\mp}$, ..., $\alpha_{m-1}^{\mp}$ is not the most economical one—$\Sigma$ is completely specified by l, the principle of formation of the binary sequence b and the angles $\alpha^0$ and $\alpha_0^+$—but is expedient for the calibration. The accuracy of measurement achievable by the angle sensor depends decisively on how accurately the code line positions, i.e. the angles $\alpha_0^+$, $\alpha_1^{\mp}$, ..., $\alpha_{m-1}^{\mp}$ are known. Since precise positioning of the code lines on the circle is complicated, it can be advantageous to consider these angles as model parameters to be identified: consequently, the manufacturing tolerances of the circle can be relaxed, and it is merely necessary to ensure that $\Sigma$ remains decodable, i.e. the binary sequence b is realized. A further advantage of the variability of the angles $\alpha_0^+, \alpha_1^{\mp}, \ldots, \alpha_{m-1}^{\mp}$ is that the model error associated with the reduction of the number of position parameters from 11 to k<11 can thus be partly compensated.

The line code $\Sigma$ is produced as an image on the array A in the following manner: on the basis of classical optics, the light density I(s) registered by the diode with midpoint $s \in ]-1, 1[$ is modelled according to $$I(s) = \int_{-\infty}^{\infty} a(\sigma - s) \cdot I^0(\sigma) \cdot \sum (\hbar_i^{-1}(\sigma, \beta; p, q, u, v, x, y)) d\sigma \quad (3)$$

where $I^0: R \to R_+$ denotes the continuous intensity distribution of the light incident unhindered on the array A and $a: R \to R_+$ describes both the response behaviour of the diodes of the array A and optical effects, such as blurring, refraction and diffraction generally. The model formulation (3), in particular the translation invariance of the diode response postulated therein, is a simplified idealization which describes the optical imaging approximately as a statistical average. If $\Im \subset [0, m[$ denotes the quantity determined by decoding a certain set of indices of the transparent code line, some or all of which can be produced as an image on the array A then $$I(s) \underset{(2)}{\overset{3}{\approx}} \sum_{i \in \Im} \int_{\hbar(\alpha_i^-, \beta; p, q, u, v, x, y)}^{\hbar(\alpha_i^+, \beta; p, q, u, v, x, y)} a(s - \sigma) \cdot I^0(\sigma) d\sigma = \quad (4)$$

$$\sum_{i \in \Im} I^0(\sigma_i) \cdot \int_{s - \hbar(\alpha_i^+, \beta; p, q, u, v, x, y)}^{s - \hbar(\alpha_i^-, \beta; p, q, u, v, x, y)} a(\sigma) d\sigma$$

The approximation (4) indicates that contributions to the diode response/can be neglected if they originate from code lines which are not produced as an image on the array A, and the equation in (4) is derived from the mean value set of the integral calculation for suitable $\sigma_i \in [\hbar(\alpha_i^-, \beta; p, q, u, v, x, y), \hbar(\alpha_i^+, \beta; p, q, u, v, x, y)]$, $i \in \Im$.

The function $a: R \to R_+$ which realistically describes the response behaviour of the diodes via (4) can be investigated theoretically or empirically; practical considerations, in particular the required computational effort, suggest an analytical form which is as simple as possible and can be differentiated continuously for all variables and a compact carrier. If, for example, $$a(\sigma; t_-, t_+) := \begin{cases} 0, & t_+ \leq |\sigma| \\ \frac{(t_+ - |\sigma|)^2}{t_+ \cdot (t_+ - t_-)}, & t_- < |\sigma| < t_+, \text{ for } 0 < t_- < t_+, \\ 1 - \frac{\sigma^2}{t_- \cdot t_+}, & |\sigma| \leq t_- \end{cases} \quad (5)$$

then $a(\cdot; t_-, t_+): R \to R$ is a symmetrical quadratic spline with carrier $[-t_+, t_+] \subset R$, for which the integrals (4) can be easily calculated analytically and can be cubic splines in s with compact carriers, which depend on $t_{\mp}$ and $\hbar(\alpha i^{\mp}, \beta; p, q, u, v, x, y)$; $i \in \Im$. If the array A of the detecting component includes n identical diodes, the midpoint of the j th diode has the coordinate $$s_j = \frac{2j - 1}{n} - 1,$$

and (4) suggests modelling the digital response $a_j \in R_+$ of the j th diode according to $$a_j = \sum_{i \in \Im} I_i \cdot \int_{s_j - \hbar(\alpha_j^+, \beta; p, q, u, v, x, y)}^{s_j - \hbar(\alpha_j^-, \beta; p, q, u, v, x, y)} a(\sigma) d\sigma + w_j, \quad 1 \leq j \leq n \quad (6)$$

where $w_j \in R$ represents all unmodelled effects contributing to the signal formation (such as dark noise, discretization errors, etc.). If the quantities occurring in (6) can be combined in the vectors or the matrix $$a := \begin{bmatrix} \alpha_j \\ \vdots \\ \alpha_n \end{bmatrix}, w := \begin{bmatrix} w_1 \\ \vdots \\ w_n \end{bmatrix} \in R^n,$$

$$A := [A_{j,i}] := \left[ \int_{s_j - \hbar(\alpha_j^-, \beta; p, q, u, v, x, y)}^{s_j - \hbar(\alpha_j^+, \beta; p, q, u, v, x, y)} a(\sigma) d\sigma \right] \in R^{n \times |\Im|},$$

$$I := \begin{bmatrix} I_{\min(\Im)} \\ \vdots \\ I_{\max(\Im)} \end{bmatrix} \in R^{|\Im|}$$

then the following is true for the vector $a \in r^n$ referred to below as signal vector $$a \stackrel{(6)}{=} A\left(\alpha_{\Im}^{\mp}, \beta; p, q, u, v, x, y; t\right) \cdot I + w, \quad (7)$$

where $\alpha_{\Im}^{\mp} := \{\alpha_{\Im}^{\mp} | i \in \Im\}$ and t denotes the vector of the parameters which specify $a: R \to R_+$—for example in equation $$t = \begin{bmatrix} t_- \\ t_+ \end{bmatrix} \in R_+^2. \quad (5)$$

As a final step of the mathematical modelling of the angle sensor, the vector $w \in R^n$ in (7) is modelled as a random vector whose probability distribution has a density $d: R^n \to R_+$. Thus, the angle sensor calibration can be formulated and solved as a statistical parameter estimation problem:

① With the uncalibrated angle sensor, the signal vectors $a^1, \ldots, a^N \in R^n$ can be registered in N circle positions $\beta^1, \ldots, \beta^N$ which can be unknown but distributed as uniformly as possible over the circle.

② Each signal vector $a^I \in R^n$ can be decoded, i.e. the quantity $\Im^J \subset [0, m[$ of indices of the transparent code line, some or all of which can be produced as an image on the array A, is determined, $1 \leq J \leq N$.

According to the model, the vectors $$w^J \stackrel{(7)}{=} a^J - A\left(\alpha_{\Im}^{\mu}{}_J, \beta^J; p, q, u, v, x, y; t\right) \cdot I^J \in R^n, 1 \leq J \leq N, \quad (8)$$

can be independent and distributed identically with probability density $d: R^n \to R_+$; the cumulative probability density is thus $$\prod_{J=1}^{N} d\left(a^J - A\left(\alpha_{\Im}^{\mu}{}_J, \beta^J; p, q, u, v, x, y; t\right) \cdot I^J\right) \in R_+. \quad (9)$$

④ The unknown parameters $I^1, \ldots, I^N$, $\beta^1, \ldots, \beta^N$, $\alpha_0^{\mp}$, $\alpha_1^{\mp}, \ldots, \alpha_{m-1}^{\mp}$, p,q,u,v,x,y,t and any further parameters specifying the probability density d can be determined so that the probability density (9) has a maximum value, respecting all secondary conditions—for example $0 < t < t_+$, if (5) is used.

If a maximum position $\hat{I}^1, \ldots, \hat{I}^N$, $\hat{\beta}^1, \ldots, \hat{\beta}^N$, $\hat{\alpha}_0^+$, $\hat{\alpha}_1^{\mp}, \ldots \hat{\alpha}_{m-1}^{\mp}$, $\hat{p}, \hat{q}, \hat{u}, \hat{v}, \hat{x}, \hat{y}, \hat{t}$ of (9) exists it is referred to as maximum likelihood (ML-) value and an algorithm used for calculating it is referred to as maximum likelihood (ML-) estimator for the parameters $I^1, \ldots, I^N$, $\beta^1, \ldots, \beta^N$, $$\hat{\alpha}_0^+, \hat{\alpha}_1^{\mu}, \ldots \hat{\alpha}_{m-1}^{\mu},$$

p,q,u,v,x,y,t. ML estimators are proven standard tools of mathematical statistics, and the optimization of multivariable functions is a standard task of numerical mathematics, for the solution of which reliable algorithms—implemented in ready-to-use form in commercially available software packages—can be available. An angle sensor calibration carried out according to steps—is referred to below as ML calibration.

If, for illustrating the method, it is assumed that $d: R^n \to R_+$ is the density of a normal distribution with expected value $\overline{w} \in R^n$ and (symmetrical and positively defined) covariance matrix $C \in R^{n \times n}$, then $$d(w) = \frac{\exp\left(\frac{(w - \overline{w})^T \cdot C^{-1} \cdot (w - \overline{w})}{2}\right)}{\sqrt{2\pi}^n \cdot \det(C)} = \quad (10)$$

$$\frac{\det(G)}{(2 \cdot \pi)^{\frac{n}{2}}} \cdot \exp\left(-\frac{\|G \cdot (w - \overline{w})\|_2^2}{2}\right), w \in R^n,$$

where $G \in R^{n \times n}$ denotes a matrix for which $$G^T \cdot G = C^{-1} \text{ and } \det(G) > 0 \quad (11)$$

—for example, the inverse of the Links-Cholesky factor of the matrix $C \in R^{n \times n}$—the ML estimation can reduce to the minimization of $$\frac{1}{2} \sum_{j=1}^{N} \left\| G \cdot \left(a^J - \overline{w}^J - A\left(\alpha_{\Im}^{\mu}, \beta^J, p, q, u, v, x, y, t\right) \cdot I^J\right) \right\|_2^2 - \quad (12)$$

$$N \cdot \log(\det(G)).$$

If it is even assumed that the measurement errors of the array diodes are signal-independent and statistically independent and have an identical normal distribution, with unknown mean value $\alpha_0 \in R$ and unknown standard deviation $\sigma < 0$, this corresponds to the choice $$\overline{w} := \alpha_0 \cdot II_n := \alpha_0 \cdot \begin{bmatrix} 1 \\ \vdots \\ 1 \end{bmatrix} \in R^n \text{ and } G := \frac{1}{\sigma} \cdot Diag(II_n) \in R^{n \times n}, \quad (13)$$

and (12) furthermore reduces to $$\frac{1}{2\cdot\sigma^2}\cdot\sum_{J=1}^{N}\left\|\alpha^J-\alpha_0\cdot II_n-A\left(\alpha_{\mathfrak{I}}^{\mu},\beta^J;p,q,u,v,x,y;t\right)\cdot I^J\right\|_2^2+$$

$$N\cdot n\cdot\log(\sigma)$$

and hence the ML calibration reduces to the minimization of (14)

$$\sum_{J=1}^{N}\left\|\alpha^J-\alpha_0\cdot II_n-A\left(\alpha_{\mathfrak{I}}^{\mu},\beta;p,q,u,v,x,y;t\right)\cdot I^J\right\|_2^2.$$

Since the sensor signals can be non-negative numbers, the normal distribution is a far from realistic model assumption which, however, has the practical advantage of basing the ML calibration on a (nonlinear) quadratic equalization problem—for example of the form (14)—which can be solved more efficiently than a general optimization problem of the form (9).

The conceptual and procedural simplicity of the ML calibration is achieved at the cost of complicated and possibly poorly conditioned maximization of the probability density (9), in which parameters can be calculated from N·n scalar data $$k+2m-1+\lambda+N+\sum_{J=1}^{N}|\mathfrak{I}^J|;$$

k=6 or k=4, l:=number of parameters required for specifying the functions $a:R \to R^+$ and $d:R^n \to R_+$—in the case of (5), (10), (13) l=3. If each code line is to be produced as an image on M signal vectors on average $$N\approx\frac{M\cdot m}{\frac{1}{N}\cdot\sum_{J=1}^{N}|\mathfrak{I}^J|}$$

should be chosen. For the typical values m=1023, n=1024, $$\frac{1}{N}\cdot\sum_{J=1}^{N}|\mathfrak{I}^J|\approx\frac{n}{20}$$

and M≈12, the result is N≈240, so that about 15,000 parameters can be determined simultaneously from about 250,000 signal values via maximization of (9). Optimization problems of this order of magnitude can be efficiently solved when their structural properties can be used for reducing the complexity, and these can be "modelled into" the solution to the problem. Thus, in specifying the function $a:R \to R_+$—as in example (5)—care should be taken to ensure a compact carrier so that the matrices occurring in (9) can be sparse.

Furthermore, boundary conditions such as $I_i^J \geq 0$, $\alpha_i^- < \alpha_i^+$, etc. should be ignored; in the case of good data the ML estimated values should automatically fulfil these conditions, and any infringements indicate that the optimization of (9) has failed, or certain modelling formulations should be modified. If the normal distribution (10) is used in (9), it may be worthwhile eliminating the variables $I^J \in R^{|\mathfrak{I}^J|}$ and $w^{-J} \in R^n$ (12)—or $\alpha_0 \in R$ in (14)—by exactly solving the corresponding linear equalization problems: then, the parameters $\beta^1, \ldots, \beta^N$, $\alpha_0^+$, $\alpha_1^{\mp}, \ldots, \alpha_{m-1}^{\mp}$, p,q,u,v,x,y,t occur explicitly, but their functional logical combination is more complex (due to the occurrence of Moore-Penrose pseudo-inverses).

The maximization of (9) is effected according to the background art to date by a proven interative method; these can be efficient when (9) can be continuously differentiated for all parameters to be estimated, and all partial first derivatives can be calculated analytically. Since the function h defined according to (0) can be continuously differentiated as often as desired for all its arguments, it is necessary to ensure continuous differentiability in the choice of the functions $a:R \to R_+$ and $d:R^n \to R_+$; it is ensured in the case of the choices (5) and (10).

Iteration methods require starting values, which for reliability and efficiency of optimization, should be close to the optimum, i.e. in the present case ML estimated values. For the parameters $\alpha_0^+, \alpha_1^{\mp}, \ldots, \alpha_{m-1}^{\mp}$ and p,q,u,v,x,y, the required values $$\hat{\alpha}_i^{\mp},$$

$0 \leq i < m$, and $\hat{p}$, $\hat{q}$, $\hat{u}=\hat{v}=\hat{x}=\hat{y}=0$ can be used, and starting values from separate signal analyses can be obtained for the parameters specifying $a:R \to R_+$ and $d: R^n \to R_+$. In the course of the decoding of the signal vector $\alpha^J \in R_n$, i.e. the determination of the index quantity $\mathfrak{I}^J \subset [0,m[$, $1 \leq J \leq N$, the maximum, the median or the centre of gravity $$\hat{s}_J^i \in ]-1,1[$$

of the peak produced by the code line i and signal $$I(\hat{s}_i^J)$$

is calculated approximately—e.g. by linear interpolation—for $i \in \mathfrak{I}^J$; in agreement with (1) and (4), $$\hat{\beta}^J:=\frac{1}{|\mathfrak{I}^J|}\sum_{i\in\mathfrak{I}}\eta_2^{-1}\left(\frac{\hat{\alpha}_i^-+\hat{\alpha}_i^+}{2},\hat{s}_i^J;\hat{p},\hat{q},\hat{u},\hat{v},\hat{x},\hat{y}\right)\text{ and} \quad (15)$$

$$\hat{I}^J:=c\cdot\begin{bmatrix}I(\hat{s}^J_{\min(\mathfrak{I}^J)})\\M\\I(\hat{s}^J_{\max(\mathfrak{I}^J)})\end{bmatrix}\in R^{|\mathfrak{I}^J|}$$

can be chosen as starting values for $\beta^J$ and $I^J \in R^{|\mathfrak{I}^J|}$, where $c \in R_+$ is the scaling factor determined by the specification of $a:R \to R_+$. If the parameters $I^J \in R^{|\mathfrak{I}^J|}$ can be eliminated as explained above, the calculation of their starting values is dispensed with.

Basing the calibration on a mathematical model—the formulation (7) with the functions $\hbar$, a, d—has further advantages in addition to the procedural simplicity achieved thereby:

Multiple sensor: The ML calibration can easily be extended to include angle sensors having a plurality of diode arrays: the product (9) to be maximized then also extends over all arrays, the parameters $\alpha_0^+, \alpha_0^\mp, \ldots, \alpha_{m-1}^\mp$ being common to all signal vectors and the circle position angles $$\hat{\beta}^1, \ldots, \hat{\beta}^N$$

of two arrays differing from one another by a constant offset. The angle offsets relative to a selected array can also be estimated, and the linear dependencies (obtained from the derivation of equation (0)) which exist between the parameters u,v,x,y of different arrays can be ignored or taken into account.

Hybrid ML calibration: If reference angles $$\hat{\beta}^1, \ldots, \hat{\beta}^{N'},$$

$1 \leq N' \leq N$, are available for some of the circle position angles $\beta^1, \ldots, \beta^{N'}$, for example $\beta^1, \ldots, \beta_{N'}$, they can also be used for the ML calibration by joining the model $$\omega^J = \hat{\beta}^J - \beta^J - \beta^0, 1 \leq J \leq N', \beta^0 \in R \text{ an offset,} \quad (16)$$

to (8). As in (7), the vector $$\omega := \begin{bmatrix} \omega^1 \\ M \\ \omega^{N'} \end{bmatrix} \in R^{N'}$$

is modelled as a random vector with probability density $d': R_{N'} \to R_+$, and the cumulative probability density $$d'\left(\begin{bmatrix} \hat{\beta}^1 - \beta^1 - \beta^0 \\ \vdots \\ \hat{\beta}^{N'} - \beta^{N'} - \beta^0 \end{bmatrix}\right) \cdot \prod_{J=1}^{N} d\left(a^J - A\left(\alpha_\Im^{\mp J}, \beta^J; p, q, u, v, x, y; t\right) \cdot I^J\right) \in R_+ \quad (17)$$

can be maximized instead of (9). The extension of the hybrid ML calibration to include multiple sensors presents no problems.

Residue analysis: After calibration is complete, the so-called residual vectors $$\hat{w}^J := \overset{(8)}{=} a^J - A\left(\hat{\alpha}^{\mp} \Im^J \hat{\beta}^J; \hat{p}, \hat{q}, \hat{u}, \hat{v}, \hat{x}, \hat{y}; \hat{t}\right) \cdot \hat{I}^J \in R^n, I \leq J \leq N, \quad (18)$$

can be calculated, which, according to the model, should be realizations of independent distributed random vectors. By statistical test methods, it is possible to investigate the extent to which this applies, from which it is possible to estimate how realistic the model is and whether it should be modified.

Angle estimation: The angle measurement with the calibrated angle sensor uses the same model as the ML calibration: Instead of (9), $$d(a - A(\hat{\alpha}_\Im^\mp, \beta; \hat{p}, \hat{q}, \hat{u}, \hat{v}, \hat{x}, \hat{y}; \hat{t}) \cdot I \in R_+ \quad (19)$$

is minimized, and the ML estimated value $\hat{\beta}$ for $\beta$ is output as an angle measurement; the ML estimated value $\hat{I}$ for I is an irrelevant byproduct, as in the calibration. The calculation of the starting values for the iteration and the extension to include multiple sensors can be the same as in the case of the ML calibration.

Permanent self-calibration: The signal vector $\alpha \in R^n$ in (19) contains sufficient information for also estimating some of the parameters p,q,u,v,x,y,t in addition to $\beta$ and I. It would therefore be possible to realize permanent self-calibration—easily extendable to include multiple sensors—which would possibly reduce the temperature and aging influences on the accuracy of measurement. The estimation of the parameters p,q,u,v,x,y,t would utilize the fact that—in contrast to $\beta$ and I—a priori information is available in the form of the latest ML estimated values $\hat{p}, \hat{q}, \hat{u}, \hat{v}, \hat{x}, \hat{y}, \hat{t}$.

Of course, the calibration described is only one of many possible embodiments and a person skilled in the art can derive alternative mathematical models or implementation forms, for example using differently formed partial systems, alternative codes or other systems/methods for imaging and detection or for signal processing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for calibrating a measuring instrument comprising:
    formulating a mathematical model describing the positions of at least two partial systems relative to one another and at least one image of at least one first partial system;
    deriving at least one parameter set, which quantifies the factors influencing systematic measurement errors of the measuring instrument, with at least one parameter from the mathematical model;
    generating of an image of structural elements of the first partial system, wherein the image contains information about the relative position of the partial systems;
    obtaining a quantity which describes a movement of the partial systems relative to one another, where the position of the structural elements and the quantity are factors influencing systematic measurement errors of the measuring instrument;

converting the image of the structural elements of the first partial system into signals by a detecting component;

recording at least one signal vector with at least one component, wherein the vector contains information, from the signals, about the relative position of the partial systems;

estimating values of the parameter set from the at least one signal vector; and deriving correction values from the values of the parameter set, the correction values are used to reduce systematic measurement errors of the measuring instrument.

2. The method according to claim 1, wherein a structural element is a mark, which contains a code.

3. The method according to claim 2, wherein the code corresponds to a m-sequence, i.e. a sequence of length $m=2^l-1$ with l as a natural number and the sequence as a cyclic binary sequence b, consisting of $$\frac{m-1}{2}$$

zeros and $$\frac{m+1}{2}$$

ones, which has the property that, for each natural number n<m, there is exactly one partial sequence of b consisting of l successive digits which represents n in binary form.

4. The method according to claim 1, wherein the parameter set contains at least one of the following parameters,
axis d (d) of rotation of the partial system,
area K of a mark of a partial system,
position angle a of a mark of a partial system,
position angle β for describing the rotation of a partial system about the axis d of rotation relative to other partial systems,
position parameter of a radiation source,
position parameter of the point of intersection of the axis d of rotation with the area K carrying the mark,
position parameter of a diode array if the detecting component includes one or more arrays of photosensitive diodes.

5. The method according to claim 4, wherein there is a matching of the zero position of the position angle α measured in plane K and of the position angle β measured in the plane normal to the axis d of rotation is effected so that, in the mathematical model describing the image, the position angle β occurs as a difference relative to the position angle α mathematical model describing the image, the position angle α.

6. The method according to claim 1, wherein the parameter set includes at least one, dimensionless and/or time-invariant, parameter which represents a logical combination of parameters, in particular from the mathematical model.

7. The method according to claim 1, wherein the method uses external reference quantities, which are not determined by the method, as values for one or more parameters.

8. The method according to claim 1, wherein before the conversion of the image of structural elements of the first partial system into signals, the method includes, as an additional step, at least one further imaging of structural elements of a partial system, which determine the relative position of a partial system on at least one of the partial systems, in particular of the second partial system on the first partial system.

9. A measuring instrument comprising:
at least two partial systems, movable relative to one another:
means for generating an image of at least one first partial system on at least one detecting component of at least one of the partial systems, the means for generating an image producing an image of structural elements which determine the relative position of a partial system in such a way that the image contains information about the relative position of the partial systems;
at least one detecting component which converts the image of the structural elements of the first partial system into signals;
means for recording at least one signal vector with at least one component, which contains information about the relative position of the partial systems, from the signals of the at least one detecting component;
means for deriving and for providing correction values which reduce the systematic measurement errors of the measuring instrument, wherein the means for deriving and for providing correction values are designed so that at least the position of the structural elements on the first partial system and a quantity which describes a movement of the partial systems relative to one another are quantified as factors influencing systematic measurement errors of the measuring instrument; and
means for reducing the systematic measurement errors of the measuring instrument.

10. The measuring instrument according to claim 9, wherein at least one of the partial systems has a rotationally symmetrical form which has one of the following shapes,
disc,
ring,
sphere,
cylinder.

11. The measuring instrument according to claim 9, wherein the imaging means includes one or more sources of electromagnetic radiation.

12. The measuring instrument according claim 9, wherein the structural element is a mark, where the mark includes a code segment having the property that the code segment can be unambiguously localized on the first partial system from the image of a code segment on the detecting component.

13. The measuring instrument according to claim 12, wherein the code corresponds to a m-sequence, i.e. a sequence of the length $m=2^l-1$ with l as a natural number and the sequence as a cyclic binary sequence b, consisting of $$\frac{m-1}{2}$$

zeros and $$\frac{m+1}{2}$$

ones, which has the property that, for each natural number n<m, there is exactly one partial sequence of b consisting of l successive digits which represents n in binary form.

14. The measuring instrument, according to claim 12, wherein the mark consists of code lines which are applied radially on a partial system having a partly flat surface in the plane of the surface, where the code is a sequence of alternately transparent and opaque code lines or as a sequence of code lines having alternately different reflectivity.

15. The measuring instrument according to claim 9, wherein the detecting component includes one or more arrays of photosensitive diodes.

16. The measuring instrument according to claim 9, wherein at least one of the means for deriving and for providing correction values, and the means for reducing systematic measurement errors have an electronic circuit.

17. The measuring instrument according to claim 9, wherein the means for reducing systematic measurement errors has an apparatus for hardware reduction of the systematic measurement errors.

18. A calibration device comprising:
at least two partial systems, movable relative to one another;
means for generating an image of at least one first partial system of the measuring instrument on at least one detecting component of the calibration device, which is mounted on at least one partial system of the measuring instrument;
structural elements adapted to determine the relative position of a partial system, the structural elements being imaged in such a way that the image contains information about the relative position of the partial systems;
at least one detecting component which converts the image of the structural elements of the first partial system into signals;
means for recording at least one signal vector with at least one component which contains information about the relative position of the partial systems from the signals of the at least one detecting component;
means for deriving and for providing correction values which reduce the systematic measurement errors of the measuring instrument, wherein the means for deriving and for providing correction values are designed so that at least the position of the structural elements on the first partial system and a quantity which describes a movement of the partial systems relative to one another are quantified as factors influencing systematic measurement errors of the measuring instrument; and
means for reducing systematic measurement errors of the measuring instrument.

19. The calibration device according to claim 18, wherein at least one of the partial systems has a rotationally symmetrical form.

20. The calibration device according to claim 18, wherein the means for generating an image include one or more sources of electromagnetic radiation.

21. The calibration device according to claim 18, wherein the structural element is a mark, where the mark includes a code segment having the property that the code segment can be unambiguously localized on the partial system from the image of a code segment on the detecting component.

22. The calibration device according to claim 21, wherein the code corresponds to a m-sequence, i.e. a sequence of the length $m=2^l-1$, with l as a natural number and the sequence as a cyclic binary sequence b, consisting of $$\frac{m-1}{2}$$

zeros and $$\frac{m+1}{2}$$

ones, which has the property that, for each natural number n<m, there is exactly one partial sequence of b consisting of l successive digits which represents n in binary form.

23. The calibration device according to claim 21, wherein the mark consists of code lines which are applied radially on a partial system having a partly flat surface, the code lines are a sequence of alternately transparent and opaque code lines, or a sequence of code lines having alternately different reflectivity.

24. The calibration device according to claim 18, wherein the detecting component includes one or more arrays of photosensitive diodes.

25. The calibration device according to claim 18, wherein the means for deriving and for providing correction values and/or the means for reducing systematic measurement errors have an electronic circuit.

26. The calibration device according to claim 18, wherein the means for reducing systematic measurement errors have an apparatus for hardware reduction of the systematic measurement errors.

27. The calibration device according claim 18, wherein at least one of, the calibration device or components of the calibration device, are in modular form.

28. A method for calibrating a plurality of measuring instruments, comprising:
formulating a mathematical model;
deriving a parameter set; and
using the mathematical model and parameter set in the calibration method of claim 1 applied to at least two measuring instruments of the plurality of measuring instruments.

29. A computer-readable medium encoded with a computer program for carrying out at least one of the steps of the method according to claim 1 for further performing the steps of:
estimating the values of the parameter set from the at least one signal vector; and
deriving and provisioning correction values, which reduce systematic measurement errors of the measuring instrument, from the values of the parameter set, where at least the position of the structural elements on the first partial system and a quantity which describes a movement of the partial systems relative to one another are factors influencing systematic measurement errors of the measuring instrument.

30. The method according to claim 4, wherein the mark has at least one of the following shapes, a disc, a ring, a sphere, or a cylinder.

31. The method according to claim 4, wherein the mark consists of a code having code lines which are applied radially to a partial system, where the code lines are a sequence of alternatively optically varying code lines.

32. The calibration device according to claim 19, wherein the form has the shape of at least one of the following: a disc; a ring; a sphere; or a cylinder.

33. The method according to claim 2, wherein the code has the property that the code segment is unambiguously localized on the first partial system from the image of a code segment on the detecting component.

* * * * *